United States Patent [19]
Cannella

[11] 3,708,212
[45] Jan. 2, 1973

[54] BRAKE APPLICATION SYSTEM

[75] Inventor: Joseph L. Cannella, Melrose Park, Ill.

[73] Assignee: Berg Mfg. & Sales Co., Des Plaines, Ill.

[22] Filed: Jan. 15, 1971

[21] Appl. No.: 106,851

[52] U.S. Cl. ................................. 303/7, 188/3 R
[51] Int. Cl. ............................................. A46d 1/04
[58] Field of Search ............... 188/3 R; 303/7, 3, 15; 137/112, 118, 102, 512.4

[56] References Cited

UNITED STATES PATENTS 3,010,469  11/1961  Leighton .......................... 137/118
3,497,267  2/1970  Dobrikin .............................. 303/15

Primary Examiner—Richard E. Aegerter
Attorney—Parker, Carter & Markey

[57] ABSTRACT

A vehicle brake application system including means effective to backfill a main service line in response to actuation of a brake application valve.

6 Claims, 2 Drawing Figures

INVENTOR.
Joseph L. Cannella
BY Parker, Carter & Markey
Attorneys.

BRAKE APPLICATION SYSTEM

OBJECTS OF THE INVENTION

This invention relates to fluid pressure brake systems for vehicles, such as tractor-trailer combinations and the like.

One purpose of the invention is to provide a system productive of rapid brake application to all of the brakes of an elongated vehicle.

Another purpose is to provide a system producing a pulse of brake pressure in remote trailer wheel brakes and a backfilling of fluid pressure in the main service line communicating said wheel brakes with a tractor application valve.

Another purpose is to provide a brake application system effective to speed the application of vehicle brakes in a tractor-trailer vehicle and simultaneously to cock a brake release system for automatic response to release of a brake application valve.

Other purposes may appear from time to time during the course of the specification and claims.

BRIEF DESCRIPTION OF THE DISCLOSURE

The invention is illustrated more or less diagrammatically in the accompanying drawings, wherein.

Like parts are indicated by like numerals throughout the specification drawings.

DESCRIPTION OF THE PREFERRED EMBODIMENT

Figure 1:
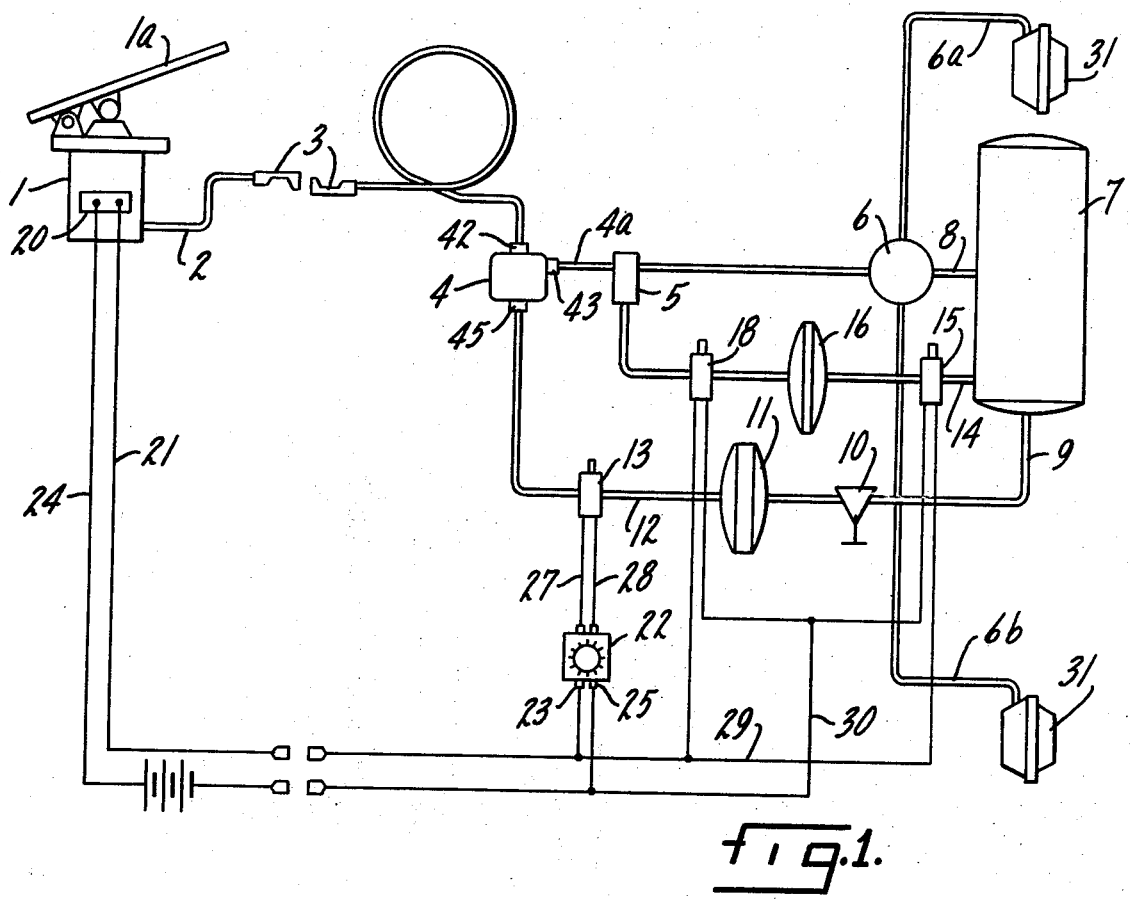
FIG. 1 is a schematic representation of the system of the invention.

Referring now to the drawings and particularly to FIG. 1, the numeral 1 generally designates a conventional brake application valve. The valve 1, for example, may take the form of the valve disclosed in U.S. Pat. No. 3,449,020 issued June 10, 1969 and entitled "Dual Force Treadle Application Valve". A main service pressure line 2 extends from valve 1 through gladhand connectors 3 to a particular type 4 two-way check valve member 4. Other lines may extend from valve 1 but are not necessary to an understanding of the invention and are, for clarity, not shown. The valve 4 is illustrated in greater detail in FIG. 2. The line 2 is shown looped to reflect its substantial extension, it being understood that the same extends the length of an elongated vehicle trailer. Fluid pressure line 4a extends from valve 4 through a conventional release valve 5 to standard relay emergency valve 6, which may, for example, take the form of that illustrated in U.S. Pat. No. 3,097,921 issued July 9, 1963 and entitled "Relay Emergency Valve".

A fluid pressure reservoir or tank 7 supplies fluid pressure to relay emergency valve 6 through the line 8. A fluid pressure line or conduit 9 supplies fluid pressure from tank 7 through a pressure regulator 10 of conventional design to a first auxiliary tank 11. Fluid pressure conduit 12 communicates the tank 11 through electrically controlled or solenoid valve 13 with the valve 4.

A fluid pressure conduit 14 supplies fluid pressure from tank 7, through solenoid 15 to a second auxiliary tank 16. A fluid pressure conduit 17 communicates the tank 16, through solenoid valve 18, with the valve 5.

An electrical switch 20 is operated in response to operation of the manually operable brake pedal 1a of valve 1. As reflected in U.S. Pat. No. 3,497,267, the switch 20 may take the form of either a directly mounted switch, as in FIG. 1 of that patent, or the form of a stoplight switch as illustrated in FIG. 2 of that patent.

A first conductor 21 connects one side of switch 20 with a terminal of a timer or time-delay device 22, as at 23. A second conductor 24 connects the other side of switch 20 with the timer 22, as at 25. Conductors 27, 28 connect the timer with valve 13. Conductor 29 connects the timer to one side of the valves 15, 18 and conductor 30 connects the timer with the other side of valves 15, 18.

The relay emergency valve 6 supplies fluid pressure to brake actuators or chambers 31 through lines 6a, 6b.

Figure 2:
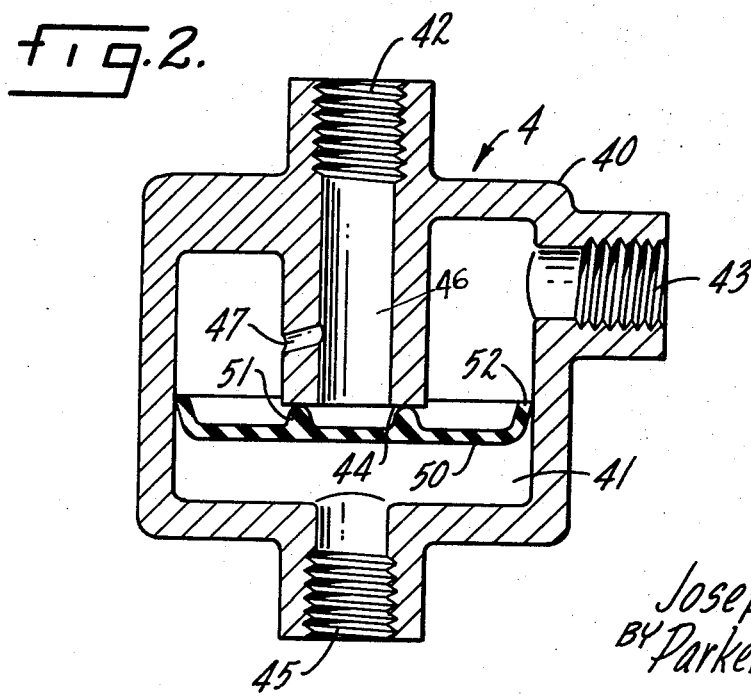
FIG. 2 is a detail view on an enlarged scale and in partial cross section of a valve member of the invention.

Referring now to FIG. 2, the valve 4 includes a housing 40 defining a chamber 41. An inlet/outlet 42 is provided for connection with main service pressure conduit 2. Outlet 43 is provided for connection with the fluid pressure conduit 4a which communicates the valve 4 through the valve 5 with relay emergency valve 6. A valve seat 44 is positioned between inlet 42 and outlet 43. An inlet 45 communicates line 12 with chamber 41. An inlet/outlet passage 46 penetrates the seat 44 and communicates with inlet/outlet 42. A restricted branch passage 47 communicates the chamber 41 between valve seat 44 and inlet/outlet 42 with the passage 46 and thus with inlet/outlet 42. A valve member 50 is provided for pressure responsive reciprocation within the chamber 41. Valve member 50 includes a valve face 51 positioned for seating on the seat 44 and a peripheral skirt portion 52 deflected in the direction of outlet 43 and engaging the wall of chamber 41.

The use and operation of the invention are as follows:

Upon actuation of the brake application pedal 1a and consequent operation of application valve 1, fluid pressure is supplied from a suitable source (not shown) through valve 1, conduit 2, the inlet/outlet 42, and valves 4 and 5 to valve 6. Because of the length of conduit 2 the line losses experienced therein and in the valves of the system, an unacceptable delay occurs between the time of operation of pedal 1a and the delivery of brake actuating fluid pressure to the brake chambers 31.

Accordingly, the electrical elements of the invention are provided. In response to operation of the pedal 1a, switch 20 is operated to deliver electrical energy to and through timer 22. It will be understood that the timer 22 is set to operate over a pre-determined, limited length of time. The timer 22 may be set to operate over a period of less than a second, for example. Actuation of switch 20 thus produces a substantially immediate, timed opening of valve 13 and a consequent supply, at a predetermined level and force, of fluid pressure from the tank 11 to the inlet 45 of valve 4. It will be understood that regulator 10 is effective to maintain a predetermined level of pressure in tank 11. Said pressure entering inlet 45 flows about the skirt portion 52 of valve 50 and through outlet 43. conduit 4a, and valve 5 to the relay valve 6 and above the service chamber therein to supply fluid pressure from main tank 7 through conduit 8, valve 6 and the conduit 6a, 6b to brake chambers 31.

It will be understood that said initial supply or "pulse" of fluid pressure is thus supplied to chambers 31 before the fluid pressure delivered through conduit 2 by valve 1 has reached valve 4. Thus a portion of the fluid pressure supplied from tank 11 through inlet 45 flows through the passages 47 and 46 and inlet/outlet 42 and into the adjacent normal downstream or distal portion of main service conduit 2, thus speeding the time for filling of conduit 2 and supplying of pressure therethrough to the valves 4 and 6.

It will be understood that the level and force of pressure initially supplied to the chambers 31 from tank 11 will be varied in accordance with the size and length of the vehicle, the nature and length of conduit 2, the amount of initial braking action desired and the like, the amount of pressure maintained in chamber 11 and the length of time during which valve 13 is held open by timer 22 being variable for this purpose. While the time factors involved are measured in less than seconds, the same may prove critical in the safe operation of a tractor-trailer vehicle.

Thus the timer 22 will cease, allowing valve 13 to close, when the conduit 2 is filled and normal service pressure is being supplied through valve 4, conduit 4a and valve 5 to relay emergency valve 6 for normal brake operation.

Valve 5 is a brake release valve normally open to passage of fluid pressure from valve 4 to valve 6. When switch 20 is operated in response to actuation of pedal 1a, electrical energy supplied directly to valves 15 and 18 closes normally open valve 18 and opens normally closed valve 15 to fill tank 16. This condition continues while pedal 1a is down and switch 20 is accordingly actuated, valves 15 and 18 not being connected through timer 22. When, however, pedal 1a is released, electrical energy is no longer supplied to valves 15,18, whereupon valve 18 opens automatically to supply fluid pressure from tank 16 to valve 5 to move the same to exhaust position and thus to exhaust the area above the service chamber in relay emergency valve 6 and to exhaust the chambers 31 therethrough, releasing the brakes. Movement of valve 5 to exhaust position closes line 4a. At the same time, valve 15 closed automatically to preclude loss of pressure from chamber 7. Thus operation of pedal 1a serves to prepare or "cock" the release system 14,17 and 5 for rapid release of the brakes in response to release of pedal 1a by the vehicle operator.

The embodiments of the invention in which an exclusive property or privilege is claimed are defined as follows:

1. A fluid pressure brake system including a brake application valve, an elongated conduit communicating said valve with brake actuating elements adjacent the distal portion of said conduit, a release valve in said distal portion, a main source of fluid pressure, an auxiliary source of fluid pressure, conduit means between said main source of fluid pressure and said auxiliary source and between said auxiliary source and said release valve, a first normally open electrically-operated valve in the conduit means between said auxiliary source and said release valve, a second normally closed electrically-operated valve in the conduit means between said main source and said auxiliary source, and means supplying electrical energy simultaneously to said valves in response to and during actuation of said application valve to close said first valve and open said second valve to communicate said auxiliary source with said main source, and means for supplying fluid pressure substantially simultaneously to said actuating elements and said distal conduit portion prior to arrival of normal fluid pressure from said application valve at said distal portion.

2. The structure of claim 1 wherein the pressure supplying means includes a tank containing a predetermined amount of fluid pressure, an electrically operated valve controlling communication between said tank and said distal portion and electrical means responsive to actuation of said application valve to open said electrically operated valve.

3. The structure of claim 2 wherein said electrical means includes a timer disengaging said electrically operated valve from said electrical means after a predetermined delay following actuation of said application valve.

4. The structure of claim 1 wherein said pressure supplying means includes a check valve member in said distal portion, a fluid pressure tank communicating with said check valve member and electrical means controlling communication between said tank and said check valve member, said electrical means being operable in response to actuation of said application valve.

5. The structure of claim 4 wherein said electrical means includes a normally closed solenoid valve between said tank and said check valve member.

6. A fluid pressure brake system including a brake application valve, a main service pressure conduit communicating said valve with a relay emergency valve adjacent the distal portion of said conduit, a source of fluid pressure, brake actuation chambers, conduit means communicating said source with said chambers through said relay emergency valve, a check valve member in said service conduit adjacent said relay emergency valve, tank and valve means supplying a predetermined amount of fluid pressure from said source to said check valve member, electrical means responsive to actuation of said application valve to open said last-named means for supply of said predetermined pressure to said check valve member, said check valve member communicating with said relay emergency valve and including means for delivering a portion of said predetermined pressure to said relay emergency valve to operate the same for delivery of fluid pressure from said source to said chambers, said check valve member further including means for delivering the remainder of said predetermined pressure to said distal portion of said service conduit upstream of said check valve member.

* * * * *